US010606895B2

(12) United States Patent
Wakankar et al.

(10) Patent No.: US 10,606,895 B2
(45) Date of Patent: Mar. 31, 2020

(54) MULTIPLE ENTITY AWARE TYPEAHEAD IN SEARCHES

(71) Applicant: Microsoft Technology Licensing, LLC, Redmond, WA (US)

(72) Inventors: Swanand Wakankar, Campbell, CA (US); Dhruv Arya, Sunnyvale, CA (US); Saurabh Kataria, Newark, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/648,220

(22) Filed: Jul. 12, 2017

(65) Prior Publication Data

US 2019/0018884 A1 Jan. 17, 2019

(51) Int. Cl.
*G06F 16/9032* (2019.01)
*G06Q 10/10* (2012.01)
*G06F 3/0482* (2013.01)
*G06F 16/248* (2019.01)
*G06Q 50/00* (2012.01)

(52) U.S. Cl.
CPC ...... *G06F 16/90324* (2019.01); *G06F 3/0482* (2013.01); *G06F 16/248* (2019.01); *G06Q 10/1053* (2013.01); *G06Q 50/01* (2013.01)

(58) Field of Classification Search
CPC ............. G06F 16/90324; G06F 16/248; G06F 3/0482; G06Q 10/1053; G06Q 50/01
See application file for complete search history.

(56) References Cited

U.S. PATENT DOCUMENTS

| 5,625,554 | A | * | 4/1997 | Cutting ............... G06F 16/3334 |
| 6,564,213 | B1 | | 5/2003 | Ortega et al. |
| 9,317,605 | B1 | * | 4/2016 | Zivkovic ............... G06F 16/951 |
| 2002/0026452 | A1 | | 2/2002 | Baumgarten et al. |
| 2012/0023120 | A1 | | 1/2012 | Kanefsky |
| 2014/0201126 | A1 | | 7/2014 | Zadeh et al. |
| 2014/0244619 | A1 | * | 8/2014 | Doroshenko ....... G06F 16/3325 707/722 |

(Continued)

OTHER PUBLICATIONS

Bignoli, P. G. (2013). Human-level natural language understanding : False progress and real challenges (Order No. 3613268). Available from ProQuest Dissertations and Theses Professional. (1511458864). Retrieved from http://dialog.proquest.com/professional/docview/1511458864?accountid=131444 (Year: 2013).*

(Continued)

*Primary Examiner* — Amanda C Abrahamson
(74) *Attorney, Agent, or Firm* — Schwegman Lundberg & Woessner, P.A.

(57) ABSTRACT

Method and system to generate multiple entity aware typeahead suggestions is provided. The system is configured to use multiple Finite State Transducers (FSTs) to examine an input string submitted by a user via a search box, and to generate one or more typeahead suggestions based on the results of the examination. Different FSTs are constructed with respect to strings identified as associated with different entity types. At least one of the typeahead suggestions includes a portion associated with one entity type and a portion associated with a different entity type.

20 Claims, 6 Drawing Sheets

(56) References Cited

U.S. PATENT DOCUMENTS

| | | | |
|---|---|---|---|
| 2015/0193447 A1* | 7/2015 | Voinea | G06F 16/9537 |
| | | | 707/767 |
| 2015/0317610 A1 | 11/2015 | Rao et al. | |
| 2015/0339311 A1 | 11/2015 | Li et al. | |
| 2016/0042067 A1* | 2/2016 | Weng | G06Q 50/01 |
| | | | 707/723 |
| 2016/0063121 A1 | 3/2016 | Agarwal et al. | |
| 2016/0098416 A1* | 4/2016 | Li | G06F 16/90324 |
| | | | 707/767 |
| 2017/0075935 A1* | 3/2017 | Lagos | G06F 16/2228 |
| 2017/0091168 A1 | 3/2017 | Bellegarda et al. | |
| 2017/0109411 A1* | 4/2017 | Daya | G06F 16/3322 |

OTHER PUBLICATIONS

"International Application Serial No. PCT/US2017/054427, International Search Report dated Dec. 15, 2017", 2 pgs.
"International Application Serial No. PCT/US2017/054427, Written Opinion dated Dec. 15, 2017", 6 pgs.
"International Application Serial No. PCT/US2017/054486, International Search Report dated Dec. 11, 2017", 2 pgs.
"International Application Serial No. PCT/US2017/054486, Written Opinion dated Dec. 11, 2017", 5 pgs.
U.S. Appl. No. 15/648,237, filed Jul. 12, 2017, Index Aware Typeahead in Searches.

* cited by examiner

MULTIPLE ENTITY AWARE TYPEAHEAD IN SEARCHES

TECHNICAL FIELD

This application relates to the technical fields of software and/or hardware technology and, in one example embodiment, to system and method to generate multiple entity aware typeahead suggestions.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member. A member profile in an on-line social network system may also represent a group, a company, a school, etc. Member profiles in an on-line social network system may be referred to as simply profiles.

An on-line social network system may include a search system that permits members to search information, such as, e.g., jobs postings, people, etc., within an on-line social network. The searches within the on-line social network may be viewed as navigational (where the intent of the search—search intent—is to locate a specific item, e.g., a particular person) or exploratory (where the intent of the search is to scan through the available information in order to identify potentially interesting or useful items). A navigational search may be fairly specific (e.g., indicating the first and last name of a person). An exploratory search, on the other hand, may return a great number of search results, which may sometimes make it difficult to identify those search results that are most useful. A search system may process a search request by matching a search string against the stored content to determine, which documents or records contain the search string. The documents that contain the search string, or references to those documents, are returned as search results. A search system may obtain a search string, e.g., by accessing input provided by a user via a search box presented as part of Graphical User Interface (GUI).

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system to generate multiple entity aware typeahead suggestions in an on-line social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate the member's connection to other members of the social network. A member profile may also include or be associated with comments or recommendations from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, provide recommendations and endorsements for each other and otherwise be in touch via the social network.

The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information about the member's professional skills, such as, e.g., "product management," "patent prosecution," "image processing," etc.).

The profile of a member may also include information about the member's current and past employment, such as company identifications, professional titles held by the associated member at the respective companies, as well as the member's dates of employment at those companies. A professional title that may be present in a member profile and indicate a professional position of the member during a particular period of employment may be referred to as a title string. Thus, a title string that appears in a member profile may be associated with a particular company and also with a period of time during which the member held, at that company, a particular position.

The on-line social network system also maintains information about various companies, as well as so-called job postings. A job posting, also referred to as merely "job" for the purposes of this description, is an electronically stored publication that includes information that an employer may post with respect to a job opening. The information in a job posting may include information associated with distinct predefined categories, such as, e.g., industry, company, job position, required and/or desirable skills, geographic location of the job, etc. These predefined categories are referred to as entity types, for the purposes of this description. For example, the strings describing professional skills of a user, such as, e.g., "patent drafting," "window cleaning," or "Java," are designated as entities of type "Skill." Strings that identify professional titles of users, such as, e.g., "software engineer" or "patent attorney," are designated as entities of type "Title." Strings that identify organizations that provide employment, such as, e.g., "Apple" or "Google," are designated as entities of type "Company."

An on-line social network system may include a search system that permits users to search for a wide range of information, such as, e.g., jobs, people, companies, etc. Users may be able to access information via a respective search directory web page that displays a keyword-based alphabetical index. Users may also access information by entering one or more keywords into the search box, engaging a control responsible for initiating a search, and examining the returned search results. As a user begins to type characters into a search box, the search system generates suggestions of how the partially entered string may be completed to form a query. For example, when a user types a sequence "le" in the search box, the search system treats the sequence "le" as prefix information and may present an option to complete the input string to read "legal," since "legal is a keyword that starts with the sequence "le." Suggestions for potential queries may be generated based semantic closeness of the prefix with the queries from a previously stored collection of potential queries, where the candidate suggestions that have been selected based on the prefix are examined to determine a suggestion that represents the most popular query (e.g., the one that was most frequently requested during a predetermined period of time), determine whether that suggestion is associated with a particular entity type (e.g., whether the string representing the suggestion is mapped to an entry in one of the standardized entities dictionary), and, if so, tag this typeahead suggestion with that entity type and present it as a selectable user interface (UI) element in the search UI that is presented on the display device of a user. This typeahead suggestion corresponds to a query that is associated with the particular entity type. If the user selects the typeahead suggestion and requests a search based on that typeahead suggestion, the search system is able to determine whether that particular entity type is associated with one or more specific fields in the collection of electronic documents and, if so, search only those specific fields in the documents from the collection.

One or more components of the search system that are engaged in processing input typed into a search box and generating suggested queries for user's selection are termed, collectively a smart typeahead system. The smart typeahead system is configured to generate query suggestions that are constructed to produce results characterized by increased relevancy and recall.

In one embodiment, the smart typeahead system is capable of generating a typeahead suggestion that corresponds to a query containing two or more different entities. For example given an input string "Java" in the search box, the smart typeahead system may produce a suggestion "Engineering jobs that require Java as a skill" or "Developer Jobs which require Java as a skill." Each of these type ahead suggestions are associated with two entity types—"Title" and "Skill."

Figure 4:
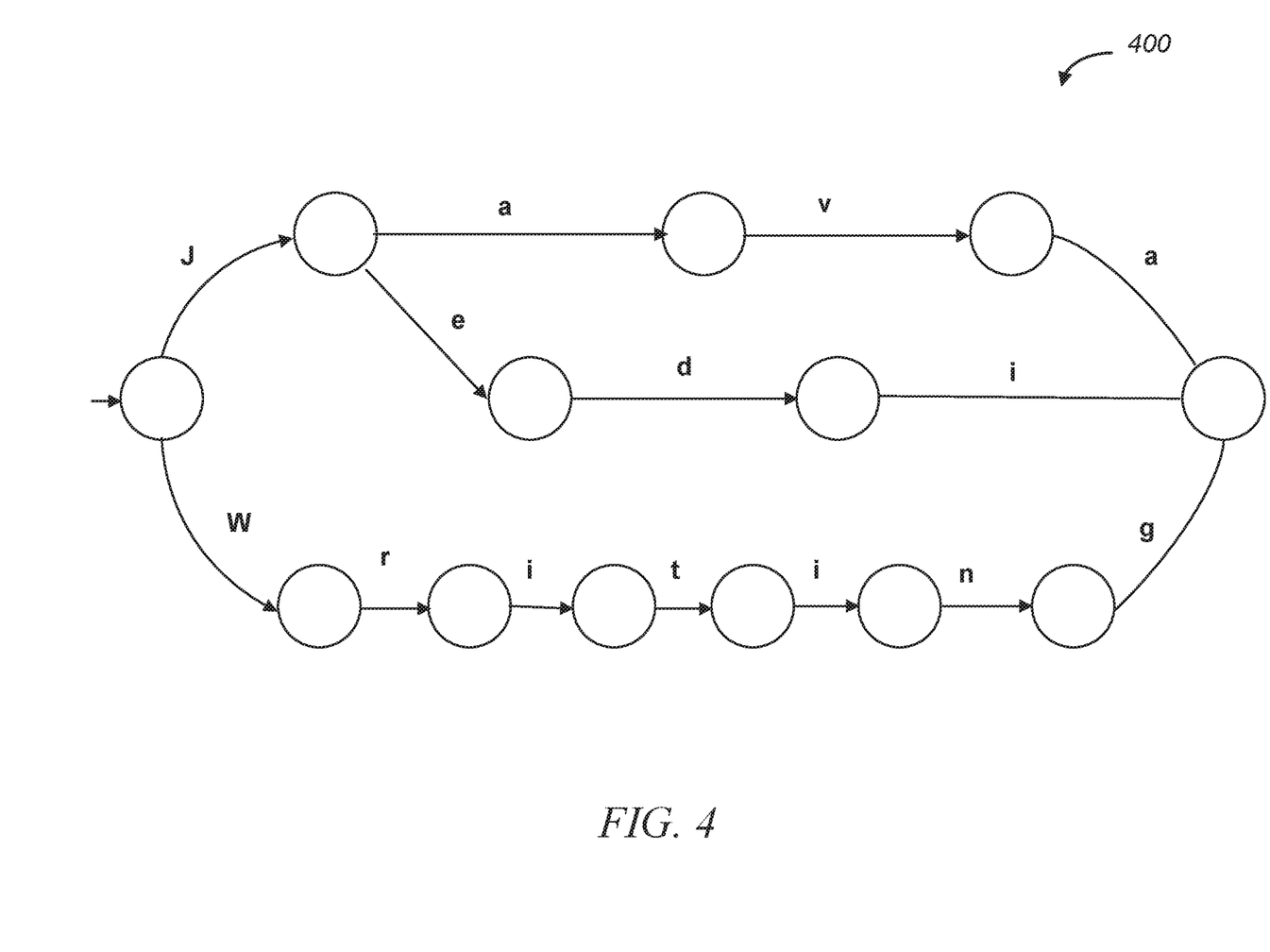
FIG. 4 is a diagrammatic representation of an example Finite State Transducer.

In order to generate multiple entity aware typeahead suggestions, the smart typeahead system generates and stores respective Finite State Transducers (FSTs) for different entity types. An FST is an in-memory data structure that contains valid suggestions (strings) and is optimized for fast retrieval and memory usage. For example, a simple FST generated for the entity type "Skill" based on strings "java," "jedi," and "writing," is shown in FIG. 4, diagram 400.

A separate FST is build for each entity type that is to be utilized in the process of generating typeahead suggestions. For example, three respective FSTs are built for "Title," "Skill," and "Company" entity types. Smart typeahead system can build an FST for a particular entity type using the standardized dictionary associated with that particular entity type.

Each string stored in an FST represents a potential valid typeahead result and it may be associated with a weight value based on various criteria, such as, e.g., popularity of the associated query, the number of active job postings associated with the string, etc. In some embodiments, the strings in FST may be assigned respective weights based on the search history stored for a specific member profile.

In operation, the smart typeahead system uses a plurality of FSTs generates based on strings of different respective entity types to determine candidate typeahead strings and then merges and blends these candidate typeahead strings to generate one or more typeahead suggestions, including suggestions that are associated with multiple entities. Referring back to the example provided above, when the smart typeahead system detects an input string "java" in the search box, it parses the FST built for the entities of type "Skill" and also parses the FST built for the entities of type "Title." The results of parsing these two FSTs are used to produce a suggestion "Engineering jobs that require Java as a skill" which corresponds to a query with two entity types—"Title" and "Skill."

Figure 5:
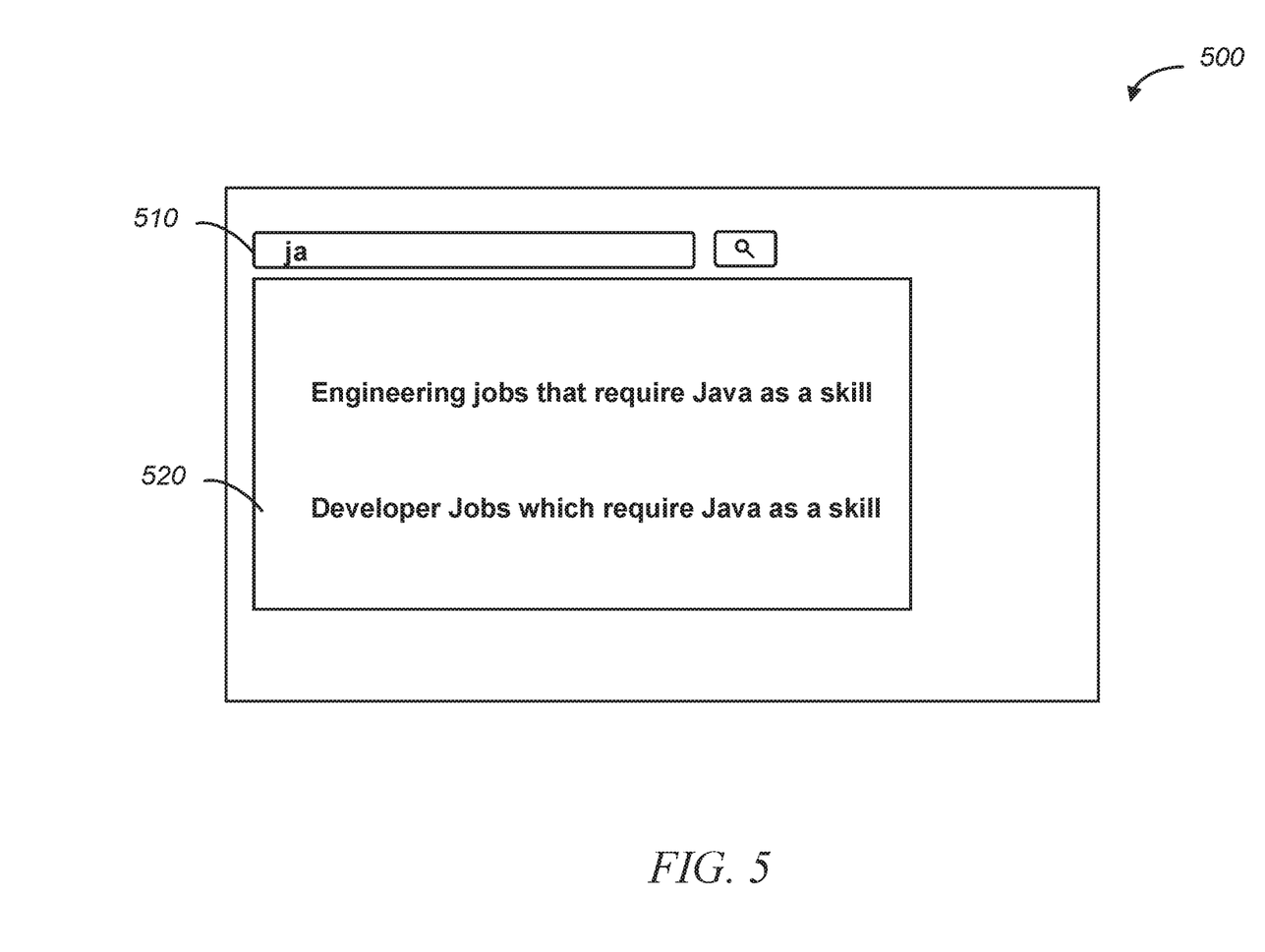
FIG. 5 is an example User Interface screen illustrating presentation of typeahead suggestions, in accordance with an example embodiment.

For example, as shown on screen 500 in FIG. 5, when a user types a sequence "ja" in the search box 510, the smart typeahead system presents, in area 520, a drop down list that includes selectable typeahead suggestions "Engineering jobs that require Java as a skill" or "Developer Jobs which require Java as a skill."

The smart typeahead system may be configured to include or to communicate with a performance evaluator, which can use multiple metrics to measure performance of the smart typeahead system. The performance evaluator can measure how the number of characters in the input string affects the relevance of typeahead suggestions. As the performance evaluator reports improvement with respect to the performance of a particular typeahead suggestion, e.g., based on an increase of user selection of that typeahead suggestion, the smart typeahead system may be adjusted to display that typeahead suggestion in response to a shorter input string, and also to display that suggestion closer to the top in the list of typeahead suggestions. The performance evaluator may be configured to calculate a click through rate (CTR) metric for a particular typeahead suggestion as the number of times a user selects a typeahead suggestion divided by the number of times the typeahead suggestion are shown. The performance evaluator can also be configured to measure recall for job search queries selected from typeahead suggestions, as well as the number of times a "No Jobs Found" page is loaded after selecting a typeahead suggestion.

The smart typeahead system may be configured to rank and blend the typeahead suggestions using, e.g., respective number of active job postings that satisfy the queries represented by different typeahead suggestions. In some embodiments, the smart typeahead system may utilize a personalized ranking model as a ranking function for typeahead suggestions. A personalized ranking model may be trained using typeahead candidate features, such term frequency—inverse document frequency (tf-idf) for typeahead candidate query logs and CTR for every typeahead candidate. A personalized ranking model can also be trained using entity aware features, such as respective CTRs for typeahead suggestions associated with different entity types, as well as personalized features, such as previous search history based on the user logs, inter industry searches for the industry of the user, intra industry searches for the industry of the user, etc. A personalized ranking model may be configured to take into account short term as well as long term query history. For example, people who searched for "Java Engineer" are more likely to search for "Java Developer," as opposed to "Journalist" or "Disk Jockey" in same session. Example method and system to generate multiple entity aware typeahead suggestions may be implemented in the context of a network environment 100 illustrated in FIG. 1.

Figure 1:
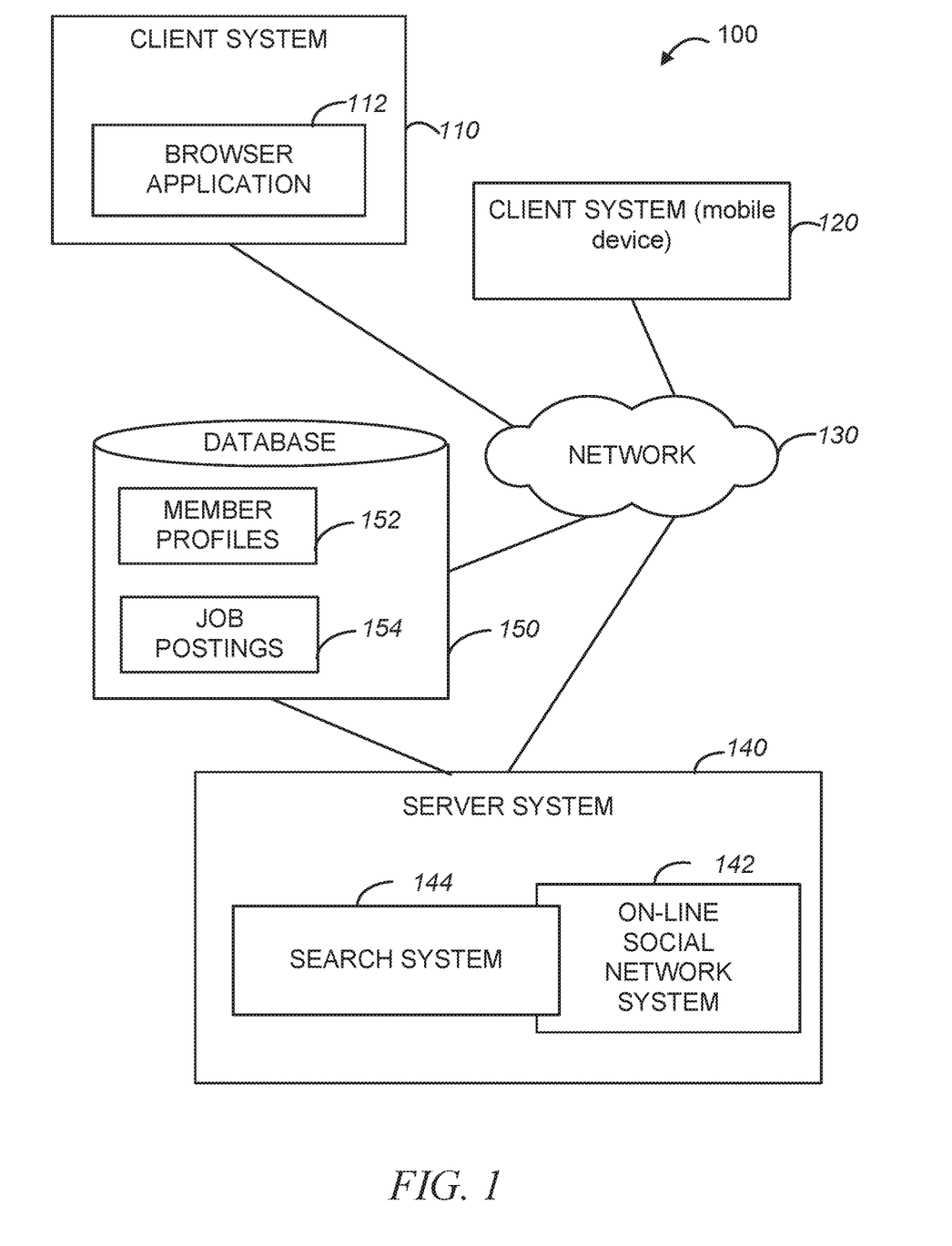
FIG. 1 is a diagrammatic representation of a network environment within which an example method and system to generate multiple entity aware typeahead suggestions may be implemented.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152. The database 150 also stores job postings 154, as well as standardized dictionaries, and query logs.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a search system 144 that may be utilized beneficially to aid users in formulating a search request. The search system 144 may include a smart typeahead system configured to generate typeahead suggestions using the methodologies described herein. As explained above, in one embodiment, the smart typeahead system provided with the search system 144 is configured to examine an input string submitted by a user via a search box, generate at least one typeahead suggestion that represents a query associated with two or more entity types, and communicate it to the client device the user. An example search system 144 is illustrated in FIG. 2.

Figure 2:
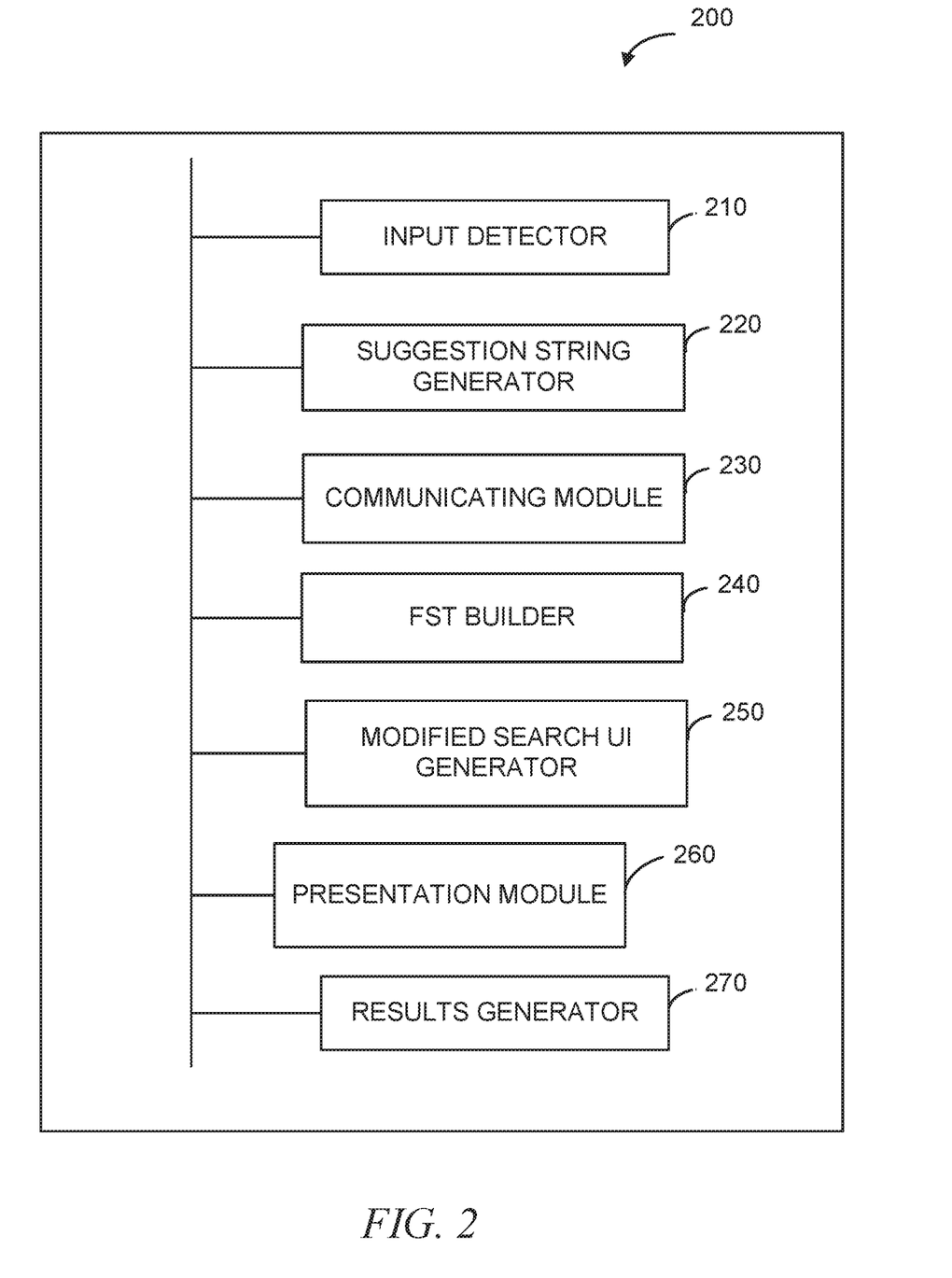
FIG. 2 is block diagram of a system to generate multiple entity aware typeahead suggestions, in accordance with one example embodiment.

FIG. 2 is a block diagram of a system 200 to generate multiple entity aware typeahead suggestions, in accordance with one example embodiment. As shown in FIG. 2, the system 200 includes an input detector 210, a suggestion string generator 220, a communicating module 230, an FST builder 240, a modified search UI generator 250, a presentation module 260, and a results generator 270.

The input detector 210 is configured to detect an input string in a search box presented on a display device of a client system as part of a search user interface (UI) of a computing application, such as, e.g., the input box 510 shown in FIG. 5. The computing application, in one embodiment, is the online social network system that maintains a plurality of job postings and a plurality of member profiles. A job posting from the plurality of job postings includes information of the first entity type (e.g., of entity type "Skill") and information of the second entity type (e.g., of entity type "Title").

The suggestion string generator 220 is configured to parse a first finite state transducer (FST) with the input string to produce a first result, the first FST containing strings of a first entity type to produce a first result and also parse a second FST with that input string to produce a second result. The first FST and the second FST contain strings of a first entity type and a second entity type respectively. For example, the first FST contains strings associated with the "Skills" entity type and the second FST contains strings associated with the "Title" entity type. The suggestion string generator 220 then generates a typeahead suggestion string based on the first result and the second result. The typeahead suggestion string represents a query that includes a first string of the first entity type and a second string of the second entity type. For example, as already described above, when the input detector 210 detects an input string "java" in the search box, it parses the FST built for the entities of type "Skill" and also parses the FST built for the entities of type "Title." The results of parsing these two FSTs are used to produce a suggestion "Engineering jobs that require Java as a skill" which corresponds to a query with two entity types—"Title" and "Skill." The FSTs are generated by the FST builder 240, which is configured to construct the first FST based on a first dictionary of standardized entities of the first entity type and to construct the second FST based on a second dictionary of standardized entities of the second entity type. The communicating module 230 is configured to communicate the typeahead suggestion string to the client system.

The modified search UI generator 250 is configured to generate a modified search UI by including a query selection control represented by the typeahead suggestion string in the search UI. The presentation module 260 is configured to cause presentation of the modified search UI on a display device. The search UI generator is also configured to include the typeahead suggestion string into the search box in response to detecting activation of the query selection control represented by that typeahead suggestion string. The results generator 270 is configured to process a query corresponding to the query selection control represented by that typeahead suggestion string. The query, in one embodiment, includes the first string of the first entity type and the second string of the second entity type. The processing of the query produces a set of search results, all or some of which that can be presented on the display device. For example, the results generator 270 can retrieve at least one job posting from the plurality of job postings that includes a string corresponding to the first string of the first entity type and a string corresponding to the second string of the second entity type. Some operations performed by the system 200 may be described with reference to FIG. 3.

Figure 3:
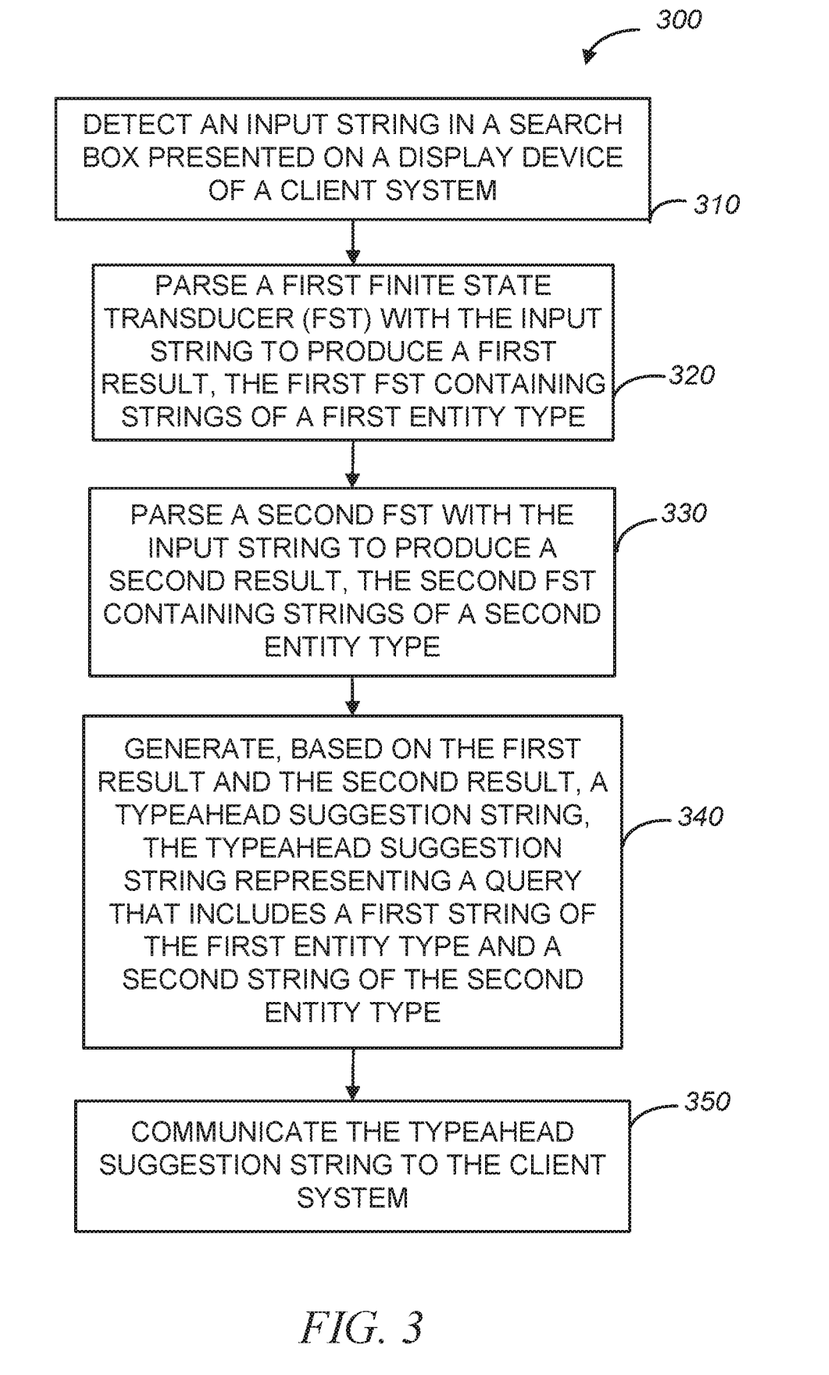
FIG. 3 is a flow chart of a method to generate multiple entity aware typeahead suggestions, in accordance with an example embodiment.

FIG. 3 is a flow chart of a method 300 to generate multiple entity aware typeahead suggestions, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the input detector 210 of FIG. 2 detects an input string in a search box presented on a display device of a client system as part of a search user interface (UI) of a computing application, such as, e.g., the input box 510 shown in FIG. 5. At operation 320, the suggestion string generator 220 parses a first FST containing strings of a first entity type to produce a first result (e.g., a string associated with the "Skills" entity type) and also parse a second FST with that input string to produce a second result (e.g., a string associated with the "Title" entity type) at operation 330. At operation 340, the suggestion string generator 220 generates a typeahead suggestion string based on the first result and the second result. As explained above, the typeahead suggestion string represents a query that includes a first string of the first entity type and a second string of the second entity type. The communicating module 230 communicates the typeahead suggestion string to the client system at operation 350.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 6:
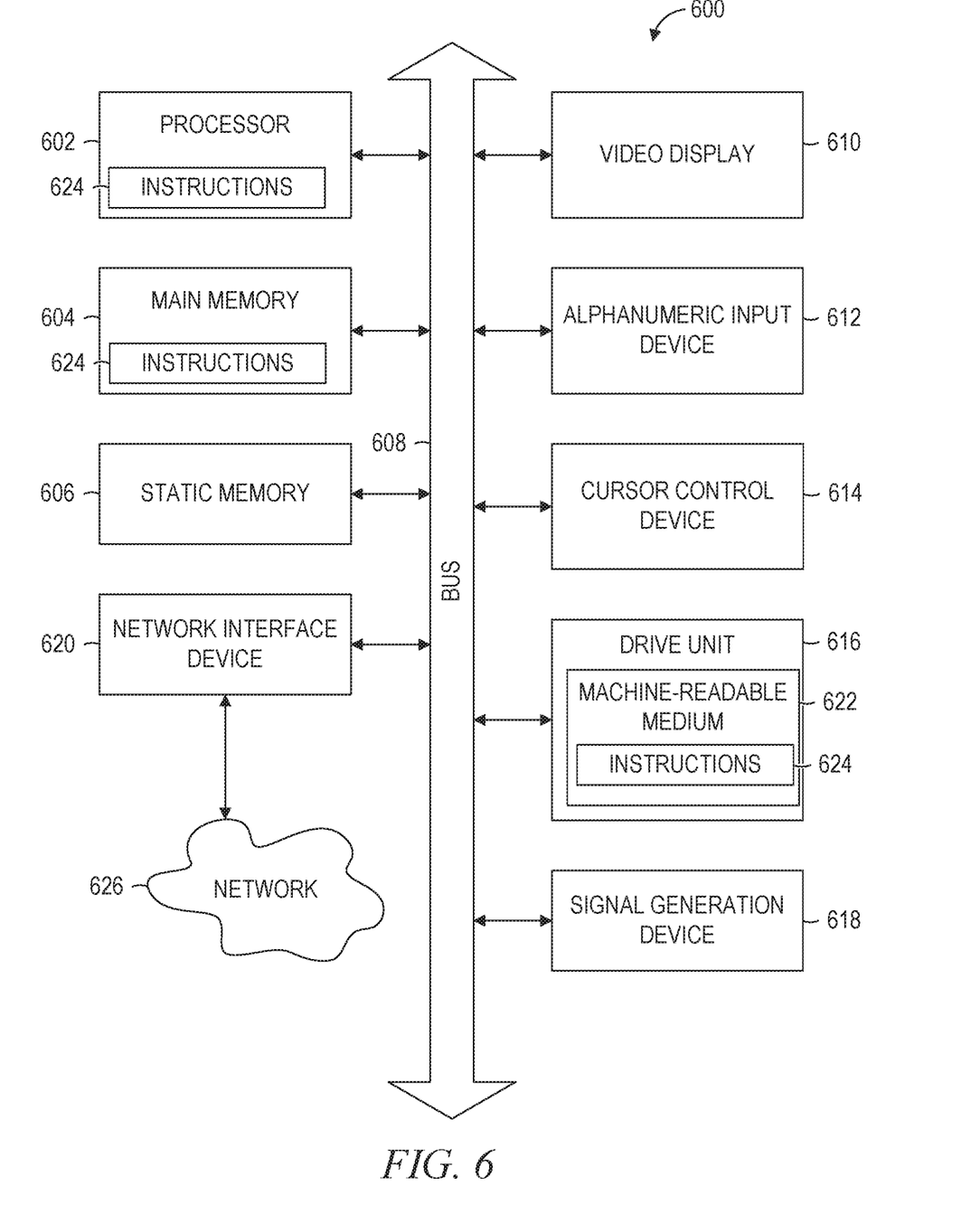
FIG. 6 is a diagrammatic representation of an example machine in the form of a computer system within which a set of instructions, for causing the machine to perform any one or more of the methodologies discussed herein, may be executed.

FIG. 6 is a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 606. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system to generate multiple entity aware typeahead suggestions have been described. While the techniques for formulating a search query have been described with reference to searches in the context of an on-line social network system, the method and system to generate multiple entity aware typeahead suggestions may be used beneficially in any context where electronic search results are being requested and retrieved. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
   storing social network member profile information, company information and job posting information as strings in a database;
   designating a first set of stored strings as entities of a first entity type in a first dictionary of standardized entities and designating a second set of stored strings as entities of a second entity type in a second dictionary of standardized entities;

storing the first dictionary of standardized entities and the second dictionary of standardized entities in the database;

constructing a first finite state transducer (FST) containing strings of the first entity type using the first dictionary of standardized entities and constructing a second FST containing strings of the second entity type using the second dictionary of standardized entities;

detecting an input string in a search box, the search box presented on a display device of a client system as part of a search user interface (UI) of a computing application;

in response to the detecting of the input string in the search box:

parsing the first FST with the input string to produce a first result of the first entity type and parsing the second FST with the input string to produce a second result of the second entity type;

generating, by a processor, a typeahead suggestion string based on the first result produced by parsing the first FST and the second result produced by parsing the second FST, the typeahead suggestion string representing a query that includes a first string of the first entity type and a second string of the second entity type; and communicating the typeahead suggestion string to the client system by displaying the typeahead suggestion on the search UI.

2. The method of claim 1, wherein the communicating the typeahead suggestion string to the client system comprises:

generating a modified search UI by including a query selection control represented by the typeahead suggestion string in the search UI; and causing presentation of the modified search UI on a display device.

3. The method of claim 2, comprising:

in response to detecting activation of the query selection control, including the typeahead suggestion string into the search box;

processing the query that includes the first string of the first entity type and the second string of the second entity type to produce a set of search results; and causing presentation, on the display device, of one or more items from the search results.

4. The method of claim 3, wherein the processing of the query that includes the first string of the first entity type and the second string of the second entity type comprises retrieving at least one job posting from the plurality of job postings that includes a string corresponding to the first string of the first entity type and a string corresponding to the second string of the second entity type.

5. The method of claim 1, wherein the computing application maintains a plurality of job postings, a job posting from the plurality of job postings including information of the first entity type and information of the second entity type.

6. The method of claim 1, wherein the computing application maintains a plurality of member profiles, a member profile from the plurality of member profiles including information of the first entity type and information of the second entity type.

7. The method of claim 1, comprising constructing the first FST based on a first dictionary of standardized entities of the first entity type and constructing the second FST based on a second dictionary of standardized entities of the second entity type.

8. The method of claim 1, wherein the first FST and the second FST are in-memory data structures.

9. The method of claim 1, wherein the computing application is an on-line social network system.

10. The method of claim 9, wherein the first entity type represents strings designated as professional skills in member profiles of the on-line social network system and the second entity type represents strings designated as professional titles in member profiles of the on-line social network system.

11. A computer-implemented system comprising:

one or more processors; and a non-transitory computer readable storage medium comprising instructions that when executed by the one or processors cause the one or more processors to perform operations comprising:

storing social network member profile information, company information and job posting information as strings in a database;

designating a first set of stored strings as entities of a first entity type in a first dictionary of standardized entities and designating a second set of stored strings as entities of a second entity type in a second dictionary of standardized entities;

storing the first dictionary of standardized entities and the second dictionary of standardized entities in the database;

constructing a first finite state transducer (FST) containing strings of the first entity type using the first dictionary of standardized entities and constructing a second FST containing strings of the second entity type using the second dictionary of standardized entities;

detecting an input string in a search box, the search box presented on a display device of a client system as part of a search user interface (UI) of a computing application;

in response to the detecting of the input string in the search box:

parsing the first FST with the input string to produce a first result of the first entity type and parsing the second FST with the input string to produce a second result of the second entity type;

generating a typeahead suggestion string based on the first result produced by parsing the first FST and the second result produced by parsing the second FST, the typeahead suggestion string representing a query that includes a first string of the first entity type and a second string of the second entity type; and communicating the typeahead suggestion string to the client system by displaying the typeahead suggestion on the search UI.

12. The system of claim 11, wherein the communicating the typeahead suggestion string to the client system comprises:

generating a modified search UI by including a query selection control represented by the typeahead suggestion string in the search UI; and causing presentation of the modified search UI on a display device.

13. The system of claim 12, comprising:

in response to detecting activation of the query selection control, including the typeahead suggestion string into the search box;

processing the query that includes the first string of the first entity type and the second string of the second entity type to produce a set of search results; and causing presentation, on the display device, of one or more items from the search results.

14. The system of claim 13, wherein the processing of the query that includes the first string of the first entity type and the second string of the second entity type comprises retrieving at least one job posting from the plurality of job postings that includes a string corresponding to the first string of the first entity type and a string corresponding to the second string of the second entity type.

15. The system of claim 11, wherein the computing application maintains a plurality of job postings, a job posting from the plurality of job postings including information of the first entity type and information of the second entity type.

16. The system of claim 11, wherein the computing application maintains a plurality of member profiles, a member profile from the plurality of member profiles including information of the first entity type and information of the second entity type.

17. The system of claim 11, comprising constructing the first FST based on a first dictionary of standardized entities of the first entity type and constructing the second FST based on a second dictionary of standardized entities of the second entity type.

18. The system of claim 11, wherein the first FST and the second FST are in-memory data structures.

19. The system of claim 11, wherein the computing application is an on-line social network system, the first entity type represents strings designated as professional skills in member profiles of the on-line social network system, and the second entity type represents strings designated as professional titles in member profiles of the on-line social network system.

20. A machine-readable non-transitory storage medium having instruction data executable by a machine to cause the machine to perform operations comprising:

storing social network member profile information, company information and job posting information as strings in a database;

designating a first set of stored strings as entities of a first entity type in a first dictionary of standardized entities and designating a second set of stored strings as entities of a second entity type in a second dictionary of standardized entities;

storing the first dictionary of standardized entities and the second dictionary of standardized entities in the database;

constructing a first finite state transducer (FST) containing strings of the first entity type using the first dictionary of standardized entities and constructing a second FST containing strings of the second entity type using the second dictionary of standardized entities;

detecting an input string in a search box, the search box presented on a display device of a client system as part of a search user interface (UI) of a computing application;

in response to the detecting of the input string in the search box:

parsing the first FST with the input string to produce a first result of the first entity type and parsing the second FST with the input string to produce a second result of the second entity type;

generating a typeahead suggestion string based on the first result produced by parsing the first FST and the second result produced by parsing the second FST, the typeahead suggestion string representing a query that includes a first string of the first entity type and a second string of the second entity type; and communicating the typeahead suggestion string to the client system by displaying the typeahead suggestion on the search UI.

\* \* \* \* \*